United States Patent [19]

Gradischnig

[11] Patent Number: 5,748,636
[45] Date of Patent: May 5, 1998

[54] METHOD FOR TRANSMITTING SIGNALING INFORMATION WITHIN A BROADBAND ISDN COMMUNICATION NETWORK

[75] Inventor: Klaus Gradischnig, Gauting, Germany

[73] Assignee: Siemens Aktiengesellschaft, Munich, Germany

[21] Appl. No.: 696,590

[22] Filed: Aug. 16, 1996

[30] Foreign Application Priority Data

Aug. 17, 1995 [DE] Germany .......................... 195 30 322.9

[51] Int. Cl.⁶ .................................................. H04J 3/16
[52] U.S. Cl. ........................ 370/469; 370/465; 370/395
[58] Field of Search ..................................... 370/352, 395,
370/397, 409, 410, 465, 466, 474, 469,
522, 524, 904

[56] References Cited

U.S. PATENT DOCUMENTS

| 5,101,403 | 3/1992 | Balzano | 370/242 |
| 5,142,528 | 8/1992 | Kobayashi et al. | 370/469 |
| 5,182,751 | 1/1993 | Bales et al. | 370/410 |
| 5,278,834 | 1/1994 | Mazzola | 370/469 |
| 5,307,347 | 4/1994 | Duault et al. | 370/439 |
| 5,504,742 | 4/1996 | Kakuma et al. | 370/420 |
| 5,600,643 | 2/1997 | Robrock, II | 370/399 |

OTHER PUBLICATIONS

Othmar Kyas—ATM–Netzwerke Aufbau, Funktion, Performance.

Primary Examiner—Wellington Chin
Assistant Examiner—Soon-Dong Hyun
Attorney, Agent, or Firm—Hill, Steadman & Simpson

[57] ABSTRACT

The transmission of signaling information between network nodes connected to one another ensues in separate signaling channels. A signaling protocol corresponding to a broadband ISDN layer model is respectively defined for such signaling information. Among other things, an ATM adaption layer (S-AAL) is defined therein which, in addition to having a general adaption sub-layer (AAL5), also has two service-specific sub-layers (SSCOP, SSCF) available to it. One of these service-specific sub-layers (SSCF) is thereby modified, as compared to ITU Recommendation Q.2140, each that, for a call set up, a communication over the respective signaling channel occurs between two network nodes connected to one another without a previous check of the transmission link.

3 Claims, 3 Drawing Sheets

FIG. 2a

| State / Event | Out Of Service/Idle 1/1/1 | Alignment/ Outgoing Connect. Pending 2/2/2 | In Service/Data Transfer Ready 3/10/5 | Aligned Ready/ Data Transfer Ready 2/10/4 |
|---|---|---|---|---|
| AAL-START.request | AA-ESTABLISH. request(SSCOP-UU: =EM,BR:=YES) 2/2/2 | illegal | illegal | illegal |
| AAL-STOP.request | illegal | AA-RELEASE.request (SSCOP-UU:=OOS) MAAL-REPORT. indication(-,OOS,-) 1/1/1 | AA-RELEASE.request (SSCOP-UU:=OOS) MAAL-REPORT. indication(-,OOS,-) 1/1/1 | AA-RELEASE.request (SSCOP-UU:=OOS) MAAL-REPORT. indication(-,OOS,-) 1/1/1 |
| AAL-MESSAGE_FOR TRANSMISSION. request | illegal | illegal | AA-DATA.request (MU:=Parameter DATA) 3/10/5 | illegal |
| AA-ESTABLISH. indication | AA-ESTABLISH. response(SSCOP-UU:=EM,BR:=YES) AA-DATA.request (MU:=INS) 2/10/4 | illegal | illegal | illegal |
| AA-ESTABLISH. confirm | illegal | AA-DATA.request (MU:=INS) 2/10/4 | illegal | illegal |
| AA-RELEASE. indication | illegal | AAL-OUT_OF_ SERVICE.indication MAAL-REPORT. indication(-,OOS,-) 1/1/1 | AAL-OUT_OF_ SERVICE.indication MAAL-REPORT. indication(-,OOS,-) 1/1/1 | AAL-OUT_OF_ SERVICE.indication MAAL-REPORT. indication(-,OOS,-) 1/1/1 |
| AA-RELEASE. confirm | 1/1/1 | illegal | illegal | illegal |
| AA-DATA.indication with MU>4 octets | illegal | illegal | AAL-RECEIVED_ MESSAGE.indication (Parameter Data:= MU) 3/10/5 | AAL-IN_SERVICE. indication MAAL-REPORT. indication(-,INS,-) 3/10/5 AAL-RECEIVED_ MESSAGE.indication (Parameter Data:= MU) 3/10/5 |

FIG. 2b

| State / Event | Out Of Service/Idle 1/1/1 | Alignment/ Outgoing Connect. Pending 2/2/2 | In Service/Data Transfer Ready 3/10/5 | Aligned Ready/ Data Transfer Ready 2/10/4 |
|---|---|---|---|---|
| AA-DATA.indication with MU=4 octets AND PDU type=INS | illegal | illegal | 3/10/5 | AAL-IN_SERVICE. indication MAAL-REPORT. indication(-,INS,-) 3/10/5 |
| AA-DATA.indication with MU<4 octets OR (MU=4 octets AND PDU type≠INS) | illegal | illegal | 3/10/5 | 2/10/4 |
| AA-RECOVER. indication | illegal | illegal | AA-RECOVER. response(-) 3/10/5 | AA-RECOVER. response(-) 2/10/4 |

METHOD FOR TRANSMITTING SIGNALING INFORMATION WITHIN A BROADBAND ISDN COMMUNICATION NETWORK

BACKGROUND OF THE INVENTION

The present invention is directed to a method for transmitting signaling information on transmission links of a broadband ISDN communication network operating in an asynchronous transfer mode (ATM). Such a method has already been disclosed in "ATM-Netzwerke-Aufbau, Function, Performance", Othmar Kyas, DATACOM Buchverlag GmbH Bergheim, 1995.

A multitude of protocol procedures for the second sub-layer (service specific coordination function, SSCF) of the ATM adaption layer are known from ITU Recommendation Q.2140 for the adaptation of the adaption layer to the first sub-layer (service specific connection oriented protocol, SSCOP) that likewise belongs to the ATM adaption layer and for the implementation of a portion of the signaling protocol determined by the adaption layer. These protocol procedures at least partially require a substantial development outlay as well as a considerable utilization of software and hardware resources, this increasing the costs for the individual nodes of a broadband ISDN communication network.

SUMMARY OF THE INVENTION

It is an object of the present invention to provide a method that reduces the control outlay and, thus, the outlay for the software and hardware resources in the individual nodes of a broadband ISDN communication network.

In general terms the present invention is a method for transmitting signaling information on transmission links of a broadband ISDN communication network operating according to an asynchronous transfer mode (ATM). Signaling channels deviating from useful channels are employed and a signaling protocol corresponding to a broadband ISDN layer model is respectively defined on the signaling channels for the set up and clear down of connections. Accordingly, a physical layer, an ATM layer, an ATM adaption layer and an application layer that controls the set up and clear down of connections are defined. In addition to a general adaption sub-layer, a first service-specific sub-layer that essentially serves for message protection and flow control, as well as a second sub-layer for adaption of this service-specific sub-layer to the application layer and for the implementation of a part of the signaling protocol are provided. Protocol procedures defined by ITU Recommendation Q.2140 for the second sub-layer are modified such that the second sub-layer, in response to a call request from the appertaining application layer, initiates a call set up by the first sub-layer. After the call set up has ensued, information indicating readiness to operate is immediately transmitted via the signaling channel under consideration and without a previous proving phase that serves the purpose of checking the transmission path. The appearance of information in the appertaining signaling channel corresponding to this information is monitored and the appertaining application layer is signaled as confirmation for the successful call set up. In response to a call request transmitted via the signaling channel, the second sub-layer has the call request signaled to it from the appertaining, first sub-layer, and, after acceptance thereof, the second sub-layer immediately transmits information indicating the readiness to operate over the signaling channel under consideration as confirmation for the readiness to operate without an aforementioned proving phase.

The present invention is also a method for transmitting signaling information on transmission links of a broadband ISDN communication network operating according to an asynchronous transfer mode (ATM). Signaling channels deviating from useful channels are employed and a signaling protocol corresponding to a broadband ISDN layer model is respectively defined on the signaling channels for the set up and clear down of connections. Accordingly, a physical layer, an ATM layer, an ATM adaption layer and an application layer that controls the set up and clear down of connections are defined. In addition to a general adaption sub-layer, a first service-specific sub-layer that essentially serves for message protection and flow control, as well as a second sub-layer serving for the adaption of this service-specific sub-layer to the application layer and for the implementation of a part of the signaling protocol are provided. Protocol procedures defined by ITU Recommendation Q.2140 for the second sub-layer are modified such that the second sub-layer, in response to a call request from the appertaining application layer, first initiates a call set up by the first sub-layer. After the call set up has ensued, information indicating readiness to operate is immediately transmitted via the signaling channel under consideration and without a previous proving phase that serves the purpose of checking the transmission path. The appearance of information corresponding to this information or of useful information for the appertaining application layer in the appertaining signaling channel is monitored and the appertaining application layer is signaled as confirmation for the successful call set up. In response to a call request transmitted via the signaling channel, the second sub-layer has the call request signaled to it from the appertaining, first sub-layer, and, after acceptance thereof, the second sub-layer immediately transmits information indicating the readiness to operate over the signaling channel under consideration as confirmation for the readiness to operate without an aforementioned proving phase.

The invention thereby yields the advantage that the second sub-layer of the ATM adaption layer modified compared to the ITU Recommendation Q.2140 is compatible with a second sub-layer implemented fully in accord with the ITU Recommendation Q.2140 with respect to the message exchange via a transmission link but other complex functions are not provided.

Another advantage of the method is that the second sub-layer modified according to the present invention can also cooperate with an ATM adaption layer of a remote station connected via a transmission link wherein no second sub-layer is implemented, in that the modified second sub-layer (in response to the output of a ready-to operate-information) also interprets the immediate appearance of useful information as confirmation of readiness to operate on the part of the remote station.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 2a and 2b shows a status table for a service-specific adaption sub-layer according to the present invention.

DESCRIPTION OF THE PREFERRED EMBODIMENTS

Figure 1:
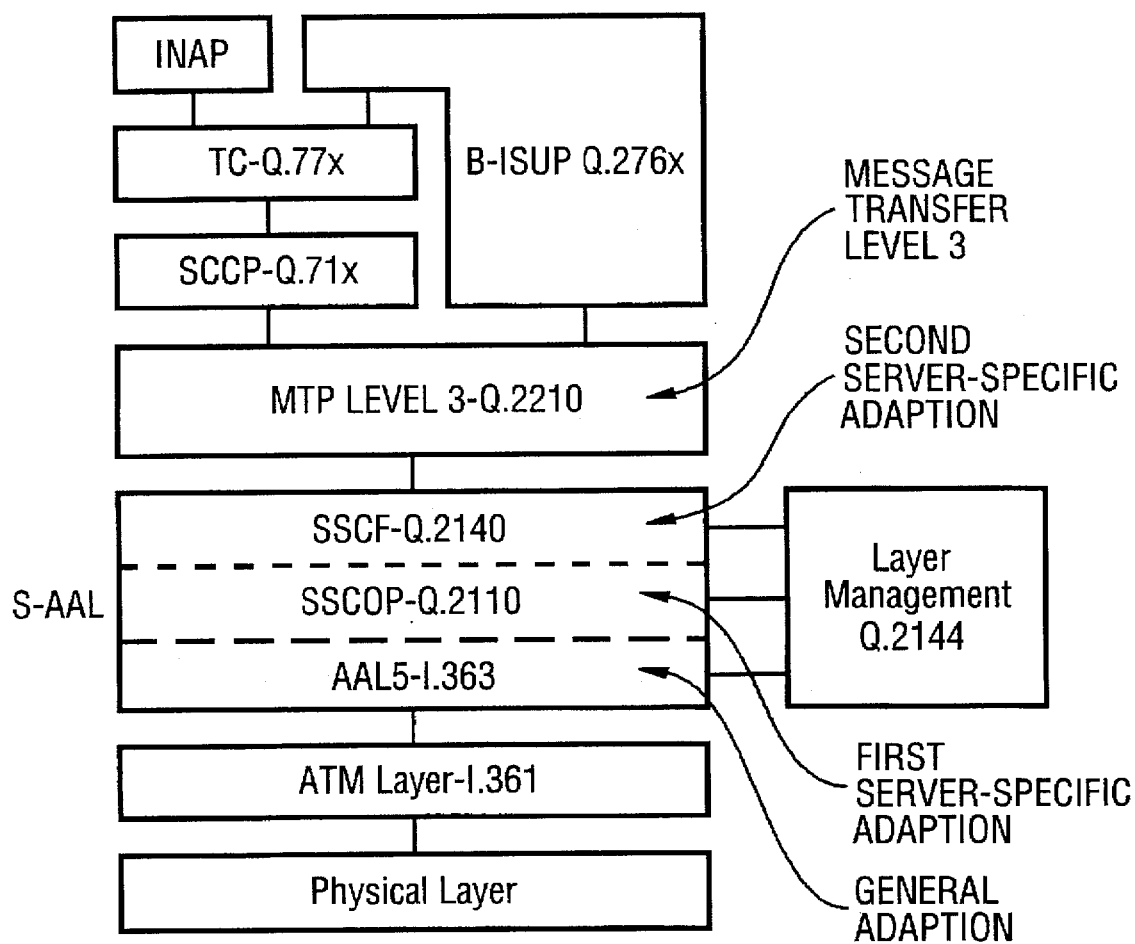
FIG. 1 schematically shows a layer model for the signaling in a broadband ISDN communication network.

In a broadband ISDN communication network operating according to the asynchronous transfer mode (ATM), signaling channels departing from the useful channels on transmission links between the individual network nodes are used for setting up and clearing down connections. A signaling protocol, for example according to the broadband ISDN layer model, is thereby defined for such a signaling. This layer model for the signaling is shown in FIG. 1, indicating the ITU Recommendations that are relevant for the individual layers. According thereto, the lowest layer is formed by the physical layer. This is followed by an ATM layer by which the format of the ATM cells to be transmitted within the communication network is essentially defined according to ITU Recommendation I.361. This is followed by an ATM adaption layer S-AAL for the signaling ("Signaling ATM Adaptation Layer"). This is divided into three sub-layers, namely a general adaption sub-layer, as well as two further service-specific adaption sub-layers.

The general adaption sub-layer that is defined by ITU Recommendation I.363 and is referenced as AAL5 (ATM adaption layer 5) essentially divides the information to be transmitted during the course of a signaling onto ATM cells or, respectively, recovers these from ATM cells and also implements a check of ATM cells for error-free transmission, for example on the basis of what is referred to as a "cyclic redundancy check code" that is respectively attached to the ATM cells.

A first of the service-specific adaption sub-layers that is referenced SSCOP (service specific connection oriented protocol) and that is defined by ITU Recommendation Q.2110 essentially serves the purpose of message protection and flow control. This is followed by the second service-specific adaption sub-layer defined in ITU Recommendation Q.2140, that is referred to as SSCF (service specific coordination function) and with which the adaption of the first service-specific adaption sub-layer (SSCOP) to a higher application layer is essentially undertaken and a part of the signaling protocol is implemented. Both service-specific adaption sub-layers are thereby in communication with a "layer management" defined by ITU Recommendation Q.2144.

Finally, the ATM matching layer S-AAL is followed by the adaption layer that has just been mentioned and that has what is referred to as a "message transfer part level 3" (MTP Level 3) defined by ITU Recommendation Q.2210 as the interface to the ATM adaption layer. The sub-layers of the adaption layer additionally indicated in FIG. 1 and referenced SCCP, TC, INAP and B-ISUP essentially realize signaling protocol parts and are defined for SCCP by ITU Recommendation Q.71x, for TC by ITU Recommendation Q.77x and for B-ISUP by ITU Recommendation Q.276x. Since these signaling protocol parts are defined and are not the subject matter of the present invention, they shall not be discussed in greater detail below.

Within the aforementioned service-specific adaption sub-layer SSCF of the ATM adaption layer, protocol procedures for a part of the signaling protocol are provided at what is referred to as a "network node interface" (NNI). This is provided in addition to protocol procedures for adaption functions that require no communication with the remote station (node) via a transmission link. What is thereby involved, for example, is what is referred to as an "initial alignment" that is implemented at the beginning of a requested call set up. In accord therewith, the service-specific adaption sub-layer SSCF (in response to a call request from the appertaining application layer (MTP Level 3)) first initiates a call set up by the second adaption sub-layer. After the call set up has ensued, the service-specific adaption sub-layer SSCF implements a proving phase wherein a check of the transmission path for freedom from error or, respectively, adequate transmission quality is implemented via a message exchange over the signaling channel coming into consideration for the respective connection. A relatively high control outlay and, thus, a high outlay for software and hardware resources is thus required for this check and the time monitoring connected therewith. After this check, the adaption sub-layer SSCF can then transmit information (in service) indicating readiness to operate over the appertaining signaling channel to the remote station, and the arrival of information from the remote station corresponding to this information is monitored. When such information arrives, then this is signaled to the appertaining application layer as confirmation for a successful call set up. The application layer can then begin with the transmission of messages defined by the signaling protocol.

In a corresponding way, the adaption sub-layer SSCF (in response to a call request transmitted via the signaling channel) signals the call request to the appertaining adaption sub-layer SSCOP and an afore-mentioned proving phase is implemented after the acceptance thereof. Information indicating readiness to operate is only transmitted after the successful implementation thereof as confirmation for the readiness to operate. This information transmitted via the signaling channel under consideration.

According to the present invention, the method that has just been explained and that is provided according to ITU Recommendation Q.2140 is modified such that the described message exchange between the adaption sub-layers SSCF of two remote stations is implemented without the above-recited proving phase in the respective remote station. This yields the advantage that the adaption sub-layer SSCF is compatible with respect to the message exchange with an adaption sub-layer SSCF fully conforming with ITU Recommendation Q.2140 but is substantially reduced in view of the outlay and need not realize any time monitoring functions, so that the employment of counters and timers can be omitted. This derives, for example, by comparing the status diagram for this sub-layer SSCF shown in FIG. 2 to the corresponding status diagram according to ITU Recommendation Q.2140.

An adaption sub-layer SSCF that is reduced according to the present invention also yields the advantage over and above this that this, for example, can be employed in network configurations wherein taking the afore-mentioned proving phase into consideration is not necessary or, respectively, yields no advantages. As an example, let ATM pilot projects be cited here, the same quality demands often not being made of these as of communication networks in full commercial use, or let transmission links be cited for which there are no standby transmission links, wherein, thus, a shut down or, respectively, non-utilization of a transmission link because of poor quality would yield no advantages but, rather, would yield disadvantages.

As already set forth above, it is provided in the above-explained exemplary embodiment that the adaption sub-layer SSCF transmits information ("in service") indicating the readiness to operate to a remote station via a signaling channel and monitors the arrival of information from the remote station corresponding to this information as confirmation for the readiness thereof to operate. In a further exemplary embodiment, this is modified to the effect that, as confirmation for the readiness of a remote station to operate, the adaption sub-layer SSCF either interprets aforementioned information received from this remote station or, without such information, interprets directly received useful information, that is, a useful information output from the application layer belonging to this remote station according to the defined signaling protocol. It is thus possible that the adaption sub-layer SSCF can also collaborate with the ATM adaption layer S-AAL of a remote station that has no adaption sub-layer SSCF available to it. This, for example, also creates the possibility of converting networks or, respectively, transmission links (that do not use an adaption sub-layer SSCF at all) successively to networks or, respectively, transmission links that employ a full adaption sub-layer SSCF according to ITU Recommendation Q.2140. First, the network or, respectively, the transmission link is successively reequipped to the reduced adaption sub-layer SSCF according to the present invention. Proceeding from this status, subsequently, the introduction of the full adaption sub-layer SSCF according to ITU Recommendation Q.2140 can successively ensue. A complex and costly, quasi-simultaneous adaptation can thus be avoided.

It was stated above that no time monitoring is implemented in the adaption sub-layer SSCF modified according to the present invention. However, the appertaining application layer, for example the sub-layer MTP Level 3, can monitor the call set up in terms of time with the output of a call request. Alternatively thereto, at least the call set up can be monitored in terms of time by the adaption sub-layer SSCF.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transmitting signaling information on transmission links of a broadband ISDN communication network working according to asynchronous transfer mode (ATM), wherein signaling channels deviating from useful channels are employed and a signaling protocol corresponding to a broadband ISDN layer model is respectively defined on said signaling channels for set up and clear down of connections according to which a physical layer, an ATM layer, an ATM adaption layer and an application layer that controls the set up and clear down of connections are defined, a general adaption sub-layer, a first service-specific sub-layer that essentially serves for message protection and flow control, and a second sub-layer serving for adaption of said first service-specific sub-layer to the application layer and for implementation of a part of the signaling protocol being provided, comprising the steps of:

modifying protocol procedures defined by ITU Recommendation Q.2140 for the second sub-layer such that the second sub-layer, in response to a call request from an appertaining application layer, first effects a call set up initiated by the first sub-layer, immediately transmitting after the call set up has ensued, first information indicating readiness to operate via a signaling channel under consideration and without a previous proving phase that checks a transmission path;

monitoring the signaling channel for the appearance of second information corresponding to the first information and, upon detecting said second information signaling the appertaining application layer as confirmation of a successful call set up; and in response to a call request transmitted via the signaling channel, the second sub-layer having the call request signaled to it from the appertaining, first sub-layer, and, after acceptance thereof, the second sub-layer immediately transmitting further information indicating readiness to operate over the signaling channel under consideration as confirmation of readiness to operate without a previous proving phase.

2. A method for transmitting signaling information on transmission links of a broadband ISDN communication network working according to asynchronous transfer mode (ATM, wherein signaling channels deviating from useful channels are employed and a signaling protocol corresponding to a broadband ISDN layer model is respectively defined on said signaling channels for set up and clear down of connections according to which a physical layer, an ATM layer, an ATM adaption layer and an application layer that controls the set up and clear down of connections are defined, a general adaption sub-layer, a first service-specific sub-layer that essentially serves for message protection and flow control, and a second sub-layer serving for adaption of said first service-specific sub-layer to the application layer and for implementation of a part of the signaling protocol being provided, comprising the steps of:

modifying protocol procedures defined by ITU Recommendation Q.2140 for the second sub-layer such that the second sub-layer, in response to a call request from an appertaining application layer, first effects a call set up initiated by the first sub-layer, immediately transmitting after the call set up has ensued, first information indicating readiness to operate via a signaling channel under consideration and without a previous proving phase that checks a transmission path;

monitoring the signaling channel for the appearance of second information corresponding to said first information or of useful information for the appertaining application layer and, upon detecting at least one of said second information and useful information signaling the appertaining application layer as confirmation of successful call set up; and in response to a call request transmitted via the signaling channel, the second sub-layer having the call request signaled to it from the first sub-layer, and, after acceptance thereof, the second sub-layer immediately transmitting further information indicating the readiness to operate over the signaling channel consideration as confirmation of readiness to operate without a previous proving phase.

3. A method for, transmitting signaling information on transmission links of a broadband ISDN communication network working according to asynchronous transfer mode (ATM), comprising the steps of:

providing signaling channels deviating from useful channels and a signaling protocol corresponding to a broadband ISDN layer model for set up and clear down of connections according to which a physical layer, an ATM layer, an ATM adaption layer and an application layer that controls the set up and clear down of connections are defined;

providing a general adaption sub-layer, a first service specific sub-layer serving for message protection and flow control, and a second sub-layer serving for adaption of said first service specific sub-layer to the application layer and for implementation of a part of the signaling protocol;

modifying protocol procedures defined by ITU Recommendation Q.2140 for the second sub-layer such that the second sub-layer, in response to a call request from an appertaining application layer, first effects a call set up initiated by the first sub-layer, immediately transmitting after the call set up has ensued, first information indicating readiness to operate via a signaling channel under consideration and without a previous proving phase that checks a transmission path;

monitoring the signaling channel for the appearance of second information corresponding to said first information or of useful information for the appertaining application layer and, upon detecting said second information, signaling the appertaining application layer as confirmation of successful call set up; and in response to a call request transmitted via the signaling channel, the second sub-layer having the call request signaled to it from the first sub-layer, and, after acceptance thereof, the second sub-layer immediately transmitting further information indicating the readiness to operate over the signaling channel consideration as confirmation of readiness to operate without a previous proving phase.

\* \* \* \* \*